(12) United States Patent
Chainer et al.

(10) Patent No.: US 6,819,513 B2
(45) Date of Patent: Nov. 16, 2004

(54) LOW POWER HARD DISK DRIVE USING MULTIPLE, INDIVIDUALLY CONTROLLABLE ACTUATORS

(75) Inventors: Timothy J. Chainer, Putnam Valley, NY (US); Anthony P. Praino, Poughquag, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 497 days.

(21) Appl. No.: 10/038,699

(22) Filed: Jan. 2, 2002

(65) Prior Publication Data
US 2003/0126158 A1 Jul. 3, 2003

(51) Int. Cl.[7] .......................... G11B 15/12; G11B 5/48; G11B 21/02
(52) U.S. Cl. .................. 360/63; 360/61; 360/75
(58) Field of Search .............. 360/61, 63, 75, 360/60

(56) References Cited

U.S. PATENT DOCUMENTS 6,344,938 B1 * 2/2002 Smith .................. 360/25
6,680,811 B2 * 1/2004 Gillis et al. ............ 360/75

FOREIGN PATENT DOCUMENTS

EP        1074979 A2 *  2/2001  ............ G11B/5/48

* cited by examiner

*Primary Examiner*—David Hudspeth
*Assistant Examiner*—Dan I Davidson
(74) *Attorney, Agent, or Firm*—Jon A. Gibbons; Robert B. Martin (57) ABSTRACT

A disk drive which incorporates separate actuators for each recording head so as to only place required recording heads over the recording media of multiple surface hard disk drives. The reduction in recording heads that are placed over the recording media reduces drag on the rotating disk holding the recording media and thereby reduces the power consumption. Reducing the number of recording heads over the recording media also reduces damage to the recording media surfaces in the event of a physical shock to the drive since inactive transducer heads are not in a position to damage the recording media.

17 Claims, 5 Drawing Sheets

LOW POWER HARD DISK DRIVE USING MULTIPLE, INDIVIDUALLY CONTROLLABLE ACTUATORS

BACKGROUND OF THE INVENTION

1. Field of the Invention

This invention generally relates to the field of magnetic disk drive data storage system design, and more particularly relates to power consumption reduction techniques used in the design of magnetic disk drives.

2. Description of Related Art

Magnetic disk drives that are used as mass storage in a computer system consume a significant amount of the total power needed to operate the system. Reducing the power consumed by computer systems is a design goal in many applications. Portable computers which operate from battery power, greatly benefit from reduced power consumption in any of their components. A reduction in power consumption in any computer system reduces heat dissipation requirements and increases longevity of computer components.

The challenge of reducing power consumption of a disk drive has resulted in the development of disk drive units that incorporate a variety of power savings modes. Power savings modes available in prior art designs include 1) Idle: shutting down electronic subsystems; 2) Standby: shutting down the spindle motor; and 3) Sleep: turning off all systems other than those needed to wake up the system. A description of an example set of operating modes typically found in disk drives is given below:

1) Active mode: In Active mode, the hard drive reads, writes, seeks and processes host commands. In this mode, typical hard drives consume approximately 2.0–2.5 watts.

2) Idle mode: Idle mode reduces power consumption by turning off some of the drive electronics at the expense of a short recovery time. In one common implementation, the recording head is moved to a parking position on the recording media, and the servo tracking function either is turned off, or operated at a reduced level of control. The disk remains spinning, the interface electronics remain ready to accept commands, and the drive will return to Active mode when a new command is received. The drive power is reduced to slightly less than 1 watt. Typically, the drive requires about 40 millisecond to return to Active mode.

3) Standby mode: In Standby mode, the recording heads are either unloaded or moved to a start/stop location on the recording media, the spindle motor is stopped, and most of the electronics are powered off. Power consumption is lowered to the range of 0.3 watts, but recovery time from Standby mode to Active mode is increased to a few seconds. The interface electronics remain ready to accept commands, and the drive will return to Active mode when a new command is received. Typically the drive requires between 1.5 and 5 seconds returning to Active mode. (Desktop and server drives may require up to 30 seconds recovering from Standby mode.)

4) Sleep mode: Sleep mode is entered by a specific command, and is used for long periods (hours) of system inactivity. All electronics are powered off except those needed to respond to a wake-up command, typically requiring about 0.1 watt. Recovery time is several seconds.

While the above described set of operating modes are representative of prior art disk drive designs, there are additional subsets of these modes such as, for example, some disk drives incorporate multiple versions of Idle mode. An example of idle mode subsets incorporated into prior art disk drives include:

1) Performance Idle mode: Performance idle mode is entered immediately following the completion of command processing in Active mode. Unlike conventional Idle mode, there is no entry delay. In Performance Idle, full servo performance is maintained, but some of the electronics are powered down. Subsequent commands are processed with no delay. Performance Idle mode power consumption is about 1.5–2.0 watts.

2) Fast Idle mode: In Fast idle mode, power consumption is similar to a conventional Idle mode. The recording head is moved to a parking location and the servo control turned off. Fast idle mode power consumption is in the 0.8 watt range. Recovery time to Active mode is about 40 ms.

3) Low Power (LP) Idle mode: In LP idle mode, the power consumption is reduced by 25% compared with Fast idle mode. The recording heads are unloaded from the disk, reducing power consumption to the 0.6 watt range. In LP idle mode, the drive has improved shock tolerance since the recording heads are not flying over the disk surfaces. Recovery time to Active mode is about 400 mS.

Modern magnetic disk drives typically utilize one or more magnetic disk platters that have magnetic recording media on both sides of each platter. In order to maximize the recording density on the magnetic disk platters, disk drive designs utilize recording transducer heads (commonly referred to as recording heads) which fly very close to the surface of the disk platter. Example disk drives utilize recording heads with a fly height of roughly 40 nanometers above the recording surface. Typically, each recording surface has a recording head dedicated to that surface and which is mounted on a slider for the purpose of flying the recording head at a fixed distance above the magnetic disk platter. The slider is then mounted on a suspension which is attached to an actuator to cause the slider to move across the surface of the magnetic disk platter.

The recording heads induce a drag on the spinning magnetic disk platters of an operating disk drive due to the proximity of the recording head to the platter. Each recording head produces an amount of drag, and the amount of drag is linearly related to the number of recording heads utilized in a disk drive. The drag induced by the recording head location above the magnetic disk platter is a significant source of power consumption in the disk drive. This is indicated by the power specifications for a typical prior art disk drive, which are shown in Table 1 for disk drives which use 8, 4 and 2 recording heads, respectively.

TABLE 1

| Prior Art Disk Drive Power Consumption vs. Mode | | |
|---|---|---|
| 8 Heads | 4 Heads | 2 Heads |
| | Startup (max. peak) | |
| 5.0 W | 4.7 W | 4.7 W |
| | Seek (average) | |
| 2.6 W | 2.3 W | 2.3 W |
| | Read (average) | |
| 2.5 W | 2.1 W | 2.0 W |
| | Write (average) | |
| 2.7 W | 2.2 W | 2.1 W |
| | Performance Idle (average) | |
| 2.0 W | 1.85 W | 1.85 W |
| | [FAST] Idle (average) | |

TABLE 1-continued

Prior Art Disk Drive Power Consumption vs. Mode

| 8 Heads | 4 Heads | 2 Heads |
|---|---|---|
| 1.3 W | 0.95 W | 0.85 W |
| | Lowpower Idle (average) | |
| 0.9 W | 0.65 W | 0.65 W |
| | Standby (average) | |
| 0.25 W | 0.25 W | 0.25 W |
| | Sleep (average) | |
| 0.1 W | 0.1 W | 0.1 W |
| | Efficiency (watts/GB) | |
| 0.02 | 0.022, 0.033 | 0.043, 0.065, 0.1 |

The above typical data shows that for the Low power Idle mode, in which the recording heads are unloaded (i.e., not flying above the disk), the power consumption is reduced by approximately 25–30% compared to the fast Idle mode in which the recording heads are flying over the disk. The average power savings is approximately 75 to 100 milliwatts per recording head with the recording heads unloaded versus loaded. This is a result of eliminating the drag of the recording heads on the rotating disk.

Prior art disk drives that are designed for mobile products consist of a single actuator, which positions all recording heads simultaneously. As a result, all recording heads are mounted to the single actuator. The mounting of all of a disk drive's recording heads on a single actuator leads to the following disadvantages:

1) operating modes can not be initiated for each individual recording head on the drive, and 2) an operating shock event occurring while the recording heads are in operation affects all recording heads in the drive simultaneously as all recording heads are flying during operation.

Therefore a need exists to overcome the problems with the prior art as discussed above, and particularly for a hard drive design that utilizes more effective techniques to reduce power consumption during operation.

SUMMARY OF THE INVENTION

According to an example embodiment of the present invention, a low power hard disk drive using multiple, individually controllable actuators comprises a method for placing a recording head over a recording media within a disk drive that maintains a plurality of recording heads within a disk drive, wherein each recording head within the plurality of recording heads may be individually activated and wherein each recording head is parked when not activated, and then determines a required recording head transducer to access a requested data set, wherein the requested data set is stored within the disk drive and wherein the required recording head transducer is a recording head transducer which may access the requested data set and finally activates only the required recording head transducer to access the requested data set.

According to an example embodiment of the present invention, a low power hard disk drive using multiple, individually controllable actuators also comprises a plurality of recording heads within the disk drive, wherein each recording head within the plurality of recording heads may be individually activated and wherein each recording head is parked when not activated and also comprises a hard disk drive controller for determining a required recording head transducer to access a requested data set, wherein the requested data set is stored within the disk drive and wherein the required recording head transducer is a recording head transducer which may access the requested data set.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DESCRIPTION OF THE PREFERRED EMBODIMENTS

It is important to note, that these embodiments are only examples of the many advantageous uses of the innovative teachings herein. In general, statements made in the specification of the present application do not necessarily limit any of the equivalent and various claimed inventions. Moreover, some statements may apply to some inventive features but not to others. In general, unless otherwise indicated, singular elements may be in the plural and visa versa with no loss of generality.

Example embodiments are illustrated in the accompanying figures. Throughout the several drawings, the same or similar components are referred to with the same identification number.

The present invention, according to a preferred embodiment, overcomes problems with the prior art by providing a disk drive design wherein each recording head is driven by a separate actuator. This design allows individual actuation of recording heads and unloading of recording heads that are not currently being used. The unloading of recording heads which are not currently being used decreases the drag on the rotating magnetic disk platter. The unloading of the recording head also minimizes the possibility of the recording head and/or slider (upon which the recording head is mounted) contacting the rotating magnetic disk in the event of a shock event. Contact by the recording head and/or slider may cause the recording head and/or slider to "crash" into the magnetic disk platter and damage the surface. Alternative embodiments of the present invention may conserve power by operating recording heads in other power conservation modes instead of simply unloading the recording head by placing the recording head into the load/unload ramp. The operation of a recording head in a power conservation mode, which includes unloading the head as well as other modes described herein, is referred to in this specification as placing the head in a parked condition.

Although the preferred embodiment discusses a hard disk, other types of rotatable storage medium such as floppy disk drives, optical disk drives, Zip Disk™ drives and others storage mediums using actuators are within the true scope and spirit of the term disk, or disk drive, as used in the present invention.

Figure 1:
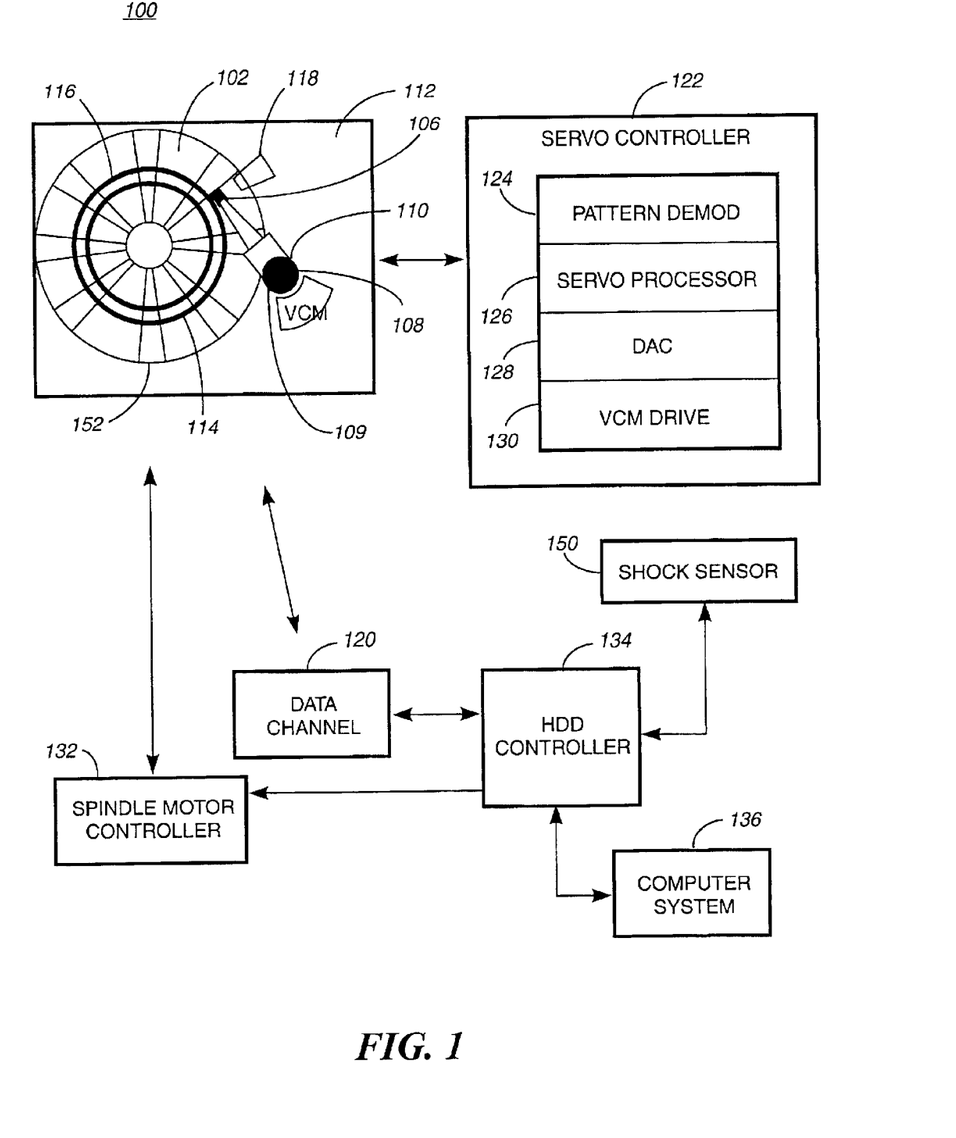
FIG. 1 is a block diagram illustrating a disk drive system in accordance with an example embodiment of the present invention.

An example disk drive architecture 100, which forms an example embodiment of the present invention, is illustrated in FIG. 1. The disk drive architecture 100 includes mechanical components of the disk drive as well as electronic circuits which interact with both the mechanical components of the disk drive and the computer system 136 that uses the disk drive to store data.

The example embodiment of a disk drive architecture 100 which embodies the present invention comprises a plurality of recording heads 106 (of which one is shown for clarity), an actuator 109 for each recording head 106, a recording medium 102 which consists of a thin magnetic media on the disk surface, a data channel 120 which conditions data for transfer between Hard Disk Drive (HDD) controller 134 (which receives and transmits data to the computer system 136) and the recording head 106. The recording head 106 of the example embodiment is able to read data from and write data to the recording media 102. The recording head 106 is positioned over a required location over the recording medium 102 through the commands of a servo controller 122 which controls operation of the VCM 108 and actuator 109 by issuing commands to the VCM drive 130 through the Digital to Analog Converter (DAC) 128. The recording head 106 reads the servo patterns 152 on the data track 116 which are input to the pattern demodulator 124 to create a position signal for the servo controller 122 to radially position the recording head 106 on the recording media 102. A spindle motor controller 132 controls the rotation of the disk which contains the recording media 102 by controlling the spindle motor 114 that rotates the recording media 102 at a specified rotational speed or to stop the recording media's rotation. Shock Sensor 150 is mounted on suspension 112 and senses shocks to the drive in order to determine if the disk surface might have been damaged. The operation of the components within the disk drive architecture 100 are controlled by a hard drive controller 134 which communicates with a computer system 136 using, for example, an industry standard SCSI interface or other communications/control interface.

Figure 2:
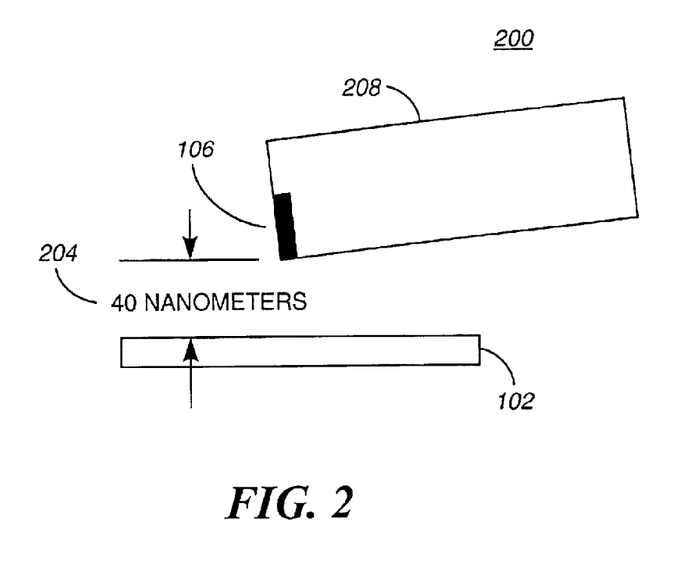
FIG. 2 shows a physical relationship of a recording media surface and a recording head in an example embodiment.

The recording head structure 200 of an example embodiment is illustrated in FIG. 2. The recording head structure 200 shows the recording head 106 of this embodiment as fabricated onto a slider 208 which positions the recording head 106 with a recording spacing 204 that is a specified distance above the recording media 102. The example recording head structure 200 illustrates a distance between the recording media and recording head of 40 nanometers, which is typical of modern disk drive designs.

The recording head 106 is positioned to a radial location on the storage medium 102 by an actuator 109. The recording head 106 is positioned via a servo controller 122 which receives a command from the HDD controller 134 in response to a request from the computer system 136 to read or write data on the disk. The servo controller 122 includes a servo demodulator 124 which decodes sector servo information 152 stored on data tracks 116 on the recording media 102 in order to determine the current location of the recording head 106. The servo processor 126 computes a control current based upon the current location and the target location generated by the HDD controller 132 which is to be generated by the DAC 128 The control current generated by DAC 128 is input to the VCM Drive 130 in order to cause the actuator assembly 109 to move to the new location. The HDD controller 132 commands includes low power modes previously described which may result in unloading the recording head 106 and stopping the spindle motor 114.

Figure 3:
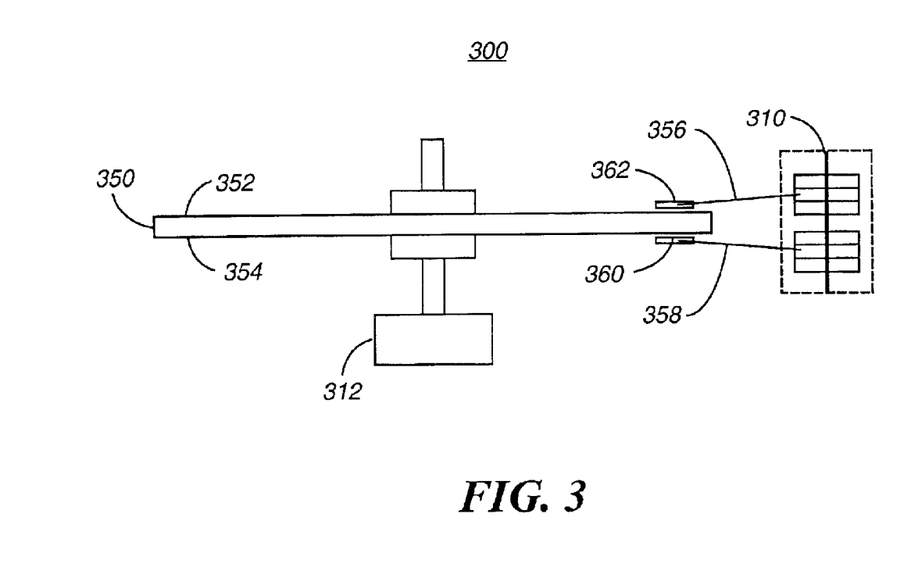
FIG. 3 illustrates the physical relationship of a disk platter holding recording media of a disk drive and multiple recording head actuators in an example embodiment of the present invention.

A disk drive profile view 300 according to the example embodiment of the present invention that includes one disk platter 350 with recording media 102 on both sides of that disk that form the upper recording surface 352 and lower recording surface 354 and which also includes two actuators, an upper actuator 356 and a lower actuator 358, which each correspond to the two recording surfaces. The disk platter 350 is rotated by the spindle motor 114. The disk drive profile view illustrates that each actuator has its own recording head, the upper recording head 362 and lower transducer head 360. The two actuators 356, 358 shown in the example disk profile view 300 share a common axis 310, but move independently of each other. The number of disk platters 350 may be increased in order to increase the amount of data that may be stored. With each additional disk platter 350, which has recording media on both sides of the disk, the example embodiment adds two actuators and appurtenant recording heads in order to access each side of the additional disk platter 350, as are shown for the example disk platter 350. The example embodiment provides separate actuators for each recording heads in order to enable separate activation and parking of each recording head. Each of these actuators is controlled by its own servo controller. Upper actuator 356 of the example embodiment is controlled by upper servo controller such as 122 (not shown) and lower actuator 358 of this embodiment is controlled by lower servo controller (not shown). Each actuator of the exemplary embodiment that is used to access data stored on surfaces of additional disk platters similarly has its own actuator.

Figure 4:
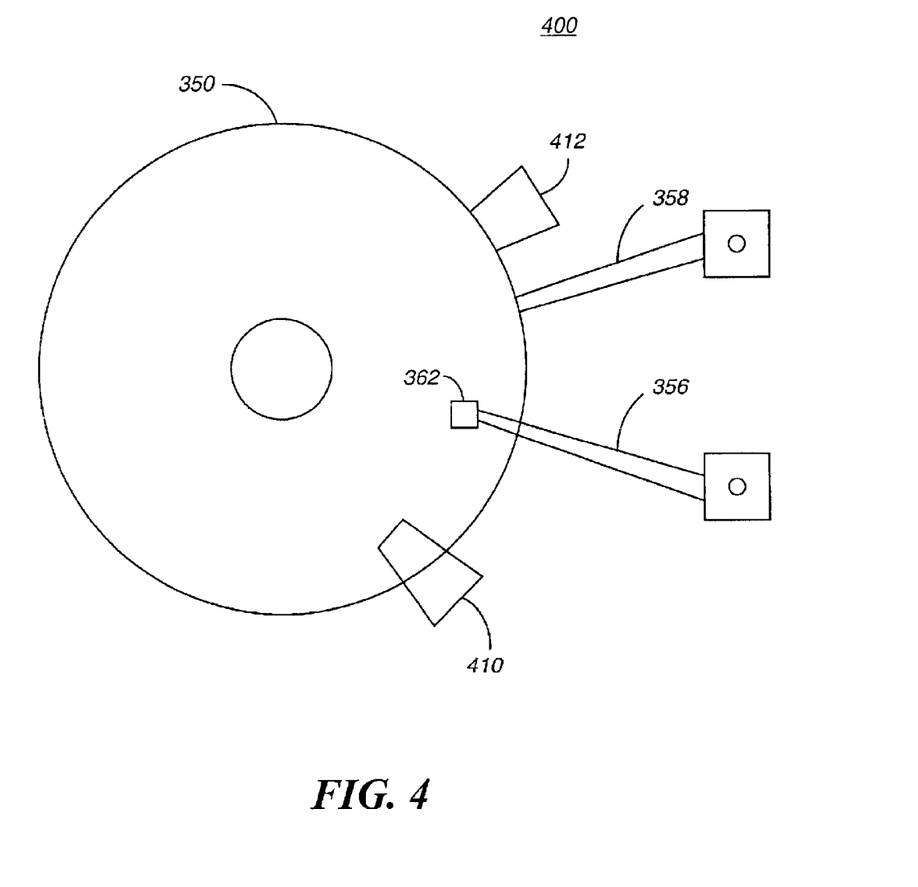
FIG. 4 illustrates the physical relationship of a disk platter holding recording media of a disk drive and multiple recording head actuators in another embodiment of the present invention

A co-planar actuator disk drive profile view 400 of an alternative embodiment of the present invention is illustrated in FIG. 4. The co-planar actuator disk drive profile view 400 shows an alternative structure wherein multiple actuators 356, 358 are mounted so as to have different rotational axes. The upper actuator 356, which positions the upper recording head 362, and the lower actuator 358, which positions the lower recording head (not shown in this illustration) are independently controllable. The recording heads may be positioned into its associated load/unload ramp. The upper recording head 362 may be unloaded onto the upper load/unload ramp 410 and the lower recording head may be unloaded onto the lower load/unload ramp 412.

The actuators utilized by the example embodiments of the present invention may be individually positioned to locate the recording head attached to that actuator over a desired position on the recording media 102. The recording heads 106 which are not in use may remain in their unloaded position on the load/load ramp 118. This results in having less than the total number of sliders 208, and their attached recording heads 106, flying over the recording media 102 at a given time. Recording heads 106 flying over the recording media 102 contribute to the total drag that the spindle motor 114 must overcome to spin the disk at a constant speed. By flying only the recording heads that are needed at any given time, the total drag on the system imparted by the recording heads 106 is reduced by $(N-J)/N$ where N is the number of recording heads in the drive and J is the number of recording heads which are selected to fly over the recording media. Since the power consumption contribution of recording heads flying over the rotating disk media in a disk drive is roughly linearly proportional to the number recording heads, this can have a significant effect on overall power consumption of the disk drive.

This conservation of power consumption achieved by the example embodiment is accompanied by an increase in the average time required to access data on the drive. The example embodiment controls the actuators associated with unused recording heads 106 to move the recording heads onto the load/unload ramp 118. The actuator must position the recording head 106 over the recording media in order to access data stored on a recording media surface. If the recording head 106 for a surface is unloaded (i.e., not flying over the recording media), the recording head 106 must be "loaded," which requires that the recording head 106 be moved to a position over the recording media from an unloaded location. This movement will take a slightly longer period of time than it would if the recording head were maintained over the recording media whenever the drive was active.

In order to provide faster average access times to stored data, the example embodiment of the disk drive implementing the present invention includes the option of improving disk drive response time performance by providing a number of operating modes which allow a trade-off between data access time and power consumption. The operating mode of the example embodiment disk drive is controlled by the computer system 136, which sends a command to the disk drive via controller 134 to enter into a given mode. In a maximum power savings mode, only one actuator will be loaded, or placed over a recording media surface at a time. In a minimum power conservation mode, all of the actuators will be operated so as to cause all recording heads 106 to be placed over the recording media and ready to access data. The example embodiment of the present invention may also be operated in intermediate modes wherein a subset of all actuators operate so as to cause the related subset of recording heads to remain over the recording media 102. The number of recording heads, which are to remain over the recoding media, is a function of the amount of power that is desired to be saved. The computer system 136 may issue a command to the hard disk drive system controller 134 which specifies the maximum number of recording heads which can be positioned over their associated recording media surface at a the same time.

When a recording head is loaded onto the media, the HDD controller 132 may select different power savings modes for each individual recording head. As an example of this operation, recording head A may be in performance idle mode and recording head B may be in fast idle mode.

In the example embodiments of this invention, HDD controller 314 is used to control the position of the actuators 109 and the spindle motor 114. The disk system interface within the computer 136 communicates the operational mode to the HDD controller 134. In a new power savings mode, the controller moves one or more of the actuators into the unloaded position. This advantageously reduces the overall drag that the spindle motor must overcome to maintain constant rotational velocity. Spindle motor power is thus reduced, while keeping the required read/write recording head in the loaded (ready) position.

Figure 5:
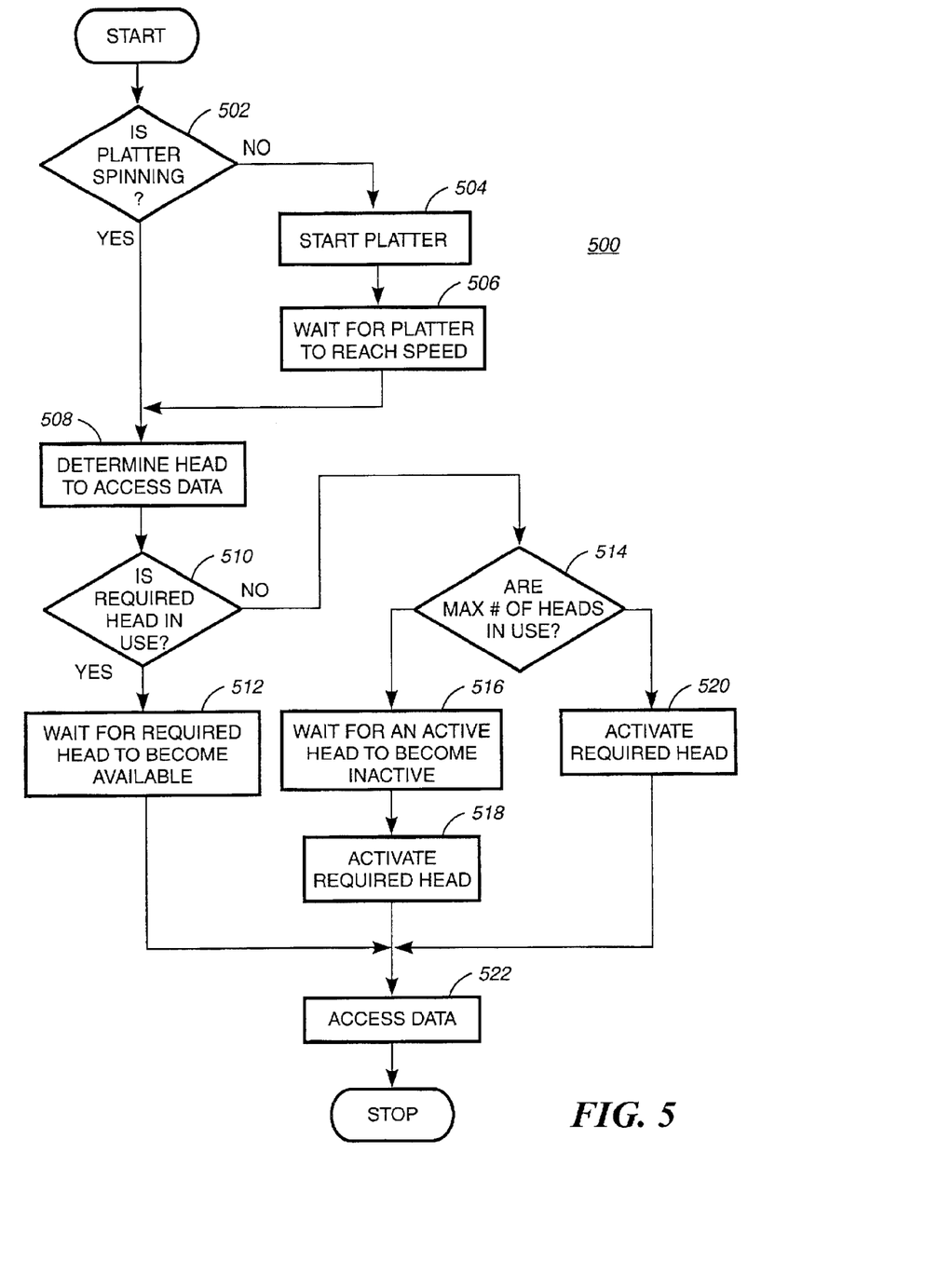
FIG. 5 illustrates the processing flow performed by an example embodiment of the present invention which activates a recording head of the disk drive.

The data access processing flow 500 that is performed by the example embodiment of the present invention is illustrated in FIG. 5. The data access processing flow 500 is performed in the example embodiment by the HDD system controller 134 in response to the receipt of a command from the computer system 136 to read or write data. The initial processing determines, in step 502, if the recording media platters are rotating at the required speed. In a power reduction operating mode, the disk drive may stop rotation of the platters containing the recording media to save power and restarting rotation is required to be resumed in order to access data. If the platter is not spinning, then processing advances to step 504 wherein the HDD controller 134 commands the spindle motor 114 to start. A finite amount of time is required to allow the spindle to attain the required rotational speed, and the HDD controller 134 waits, in step 506, for the spindle to attain the required speed.

Once the platter is rotating at the required speed, processing continues with step 508 wherein the HDD controller 134 determines which platter contains the data, and thereby which actuator is required to move a recording head onto the recording media to access that data. The HDD controller, in step 510, determines if the recording head required to access the requested data is already being used in a data transfer, and is therefore not unloaded. If the required recording head is in use, processing continues to step 512 wherein the HDD controller waits for the required recording head to become available. If the required recording head is not in use, processing resumes with step 514 to determine if the required recording head may be actuated, i.e., moved over the recording media 102. The example embodiment of the present invention may limit the number of recording heads which may be activated in order to save power, as described above. If the maximum number of recording heads is in use, the processing advances to step 516 to wait for an active recording head to be inactivated. Once an active recording head becomes inactivated, processing continues with step 518 to activate the required recording head in order to access the requested data. If the processing of step 514 determines that the maximum number of recording heads is not in use, then processing advances to step 520 wherein the required recording head is activated. After the required recording head is activated in either step 518 or step 520, processing continues with the processing of step 522 wherein the requested data is accessed.

The example embodiment of the present invention utilizes the selective activation of recording head actuators to mitigate the effects of a head crash. A head crash may be caused by a physical shock to the disk drive which causes the slider 208 to physically contact the recording media 102. This contact may result in physical damage to the surface of the recording media 102, slider 208 and/or recording head 106. Prior art disk drives, which operate with all recording heads in place over the multiple surfaces of the recording media 102, typically suffer physical damage to multiple recording media surfaces because multiple recording heads are in place to impact the surfaces. The example embodiments of the present invention, which operate with only one recording head over a recording surface at a time, limit the number of recording media surfaces which are impacted by a recording head when a shock event occurs to only the recording surface which has an active recording head during the shock.

Figure 6:
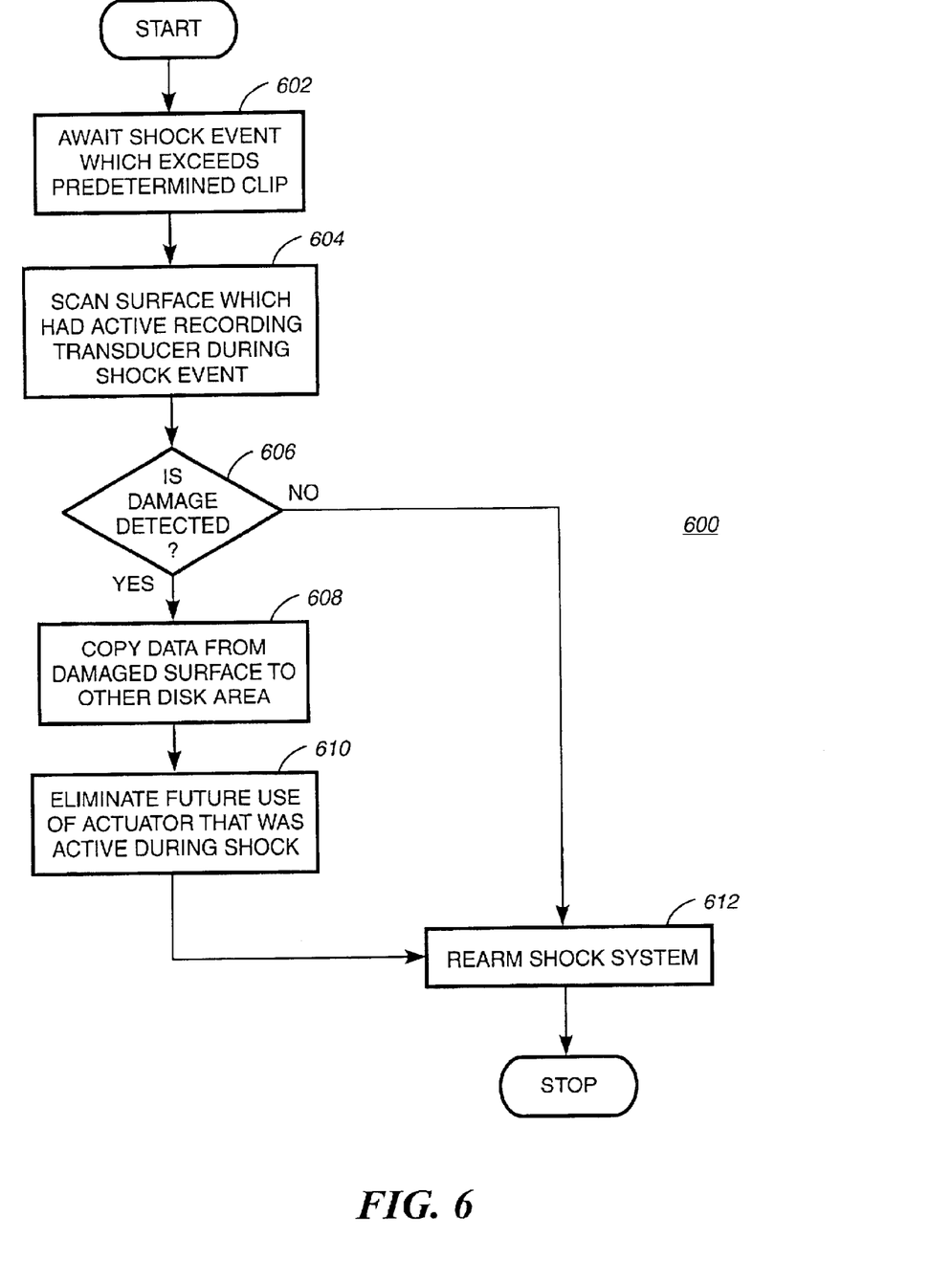
FIG. 6 is a processing flow diagram of an example embodiment of the present invention which mitigates the effects of damage to a disk surface caused by a physical shock to the disk drive.

The example embodiment of the present invention mitigates the effects of a head crash not only by limiting the number of recording media surfaces which are damaged during a shock event but by operating to determine if a head crash has damaged a recording surface, removing recoverable data on a damaged surface to other recording media surfaces and then disabling further use of the recording head associated with the damaged surface. The head crash mitigation processing 600, which is performed by the example embodiment to mitigate the effects of a head crash, is shown in FIG. 6.

The example embodiment of the present invention incorporates a shock sensor 150 to determine if the disk drive encounters a shock above a predetermined clip, i.e. a shock which might result in a head crash. The head crash mitigation processing 600 of the example embodiment starts with the processing in step 602 wherein a shock is determined by the shock sensor 150. The shock sensor of the illustrated embodiment is shown as mounted on the suspension 112. Alternative embodiments may locate one or more shock sensors at other location on the HDD. Once a shock that is above a preset threshold is detected in step 602, processing continues with step 604 wherein the recording surface that had an active recording head during the shock event is scanned to determine if there is damage.

The example embodiment of the present invention utilizes thermal proximity sensing within step 604 to identify if a rotating recording media surface is damaged. Thermal proximity sensing is defined in detail in U.S. Pat. No. 5,810,477, which is hereby incorporated herein by reference. Thermal proximity sensing detects irregularities in the gap between the recording head and recording media surface by sensing changes in the resistivity of a recording head due to temperature changes caused by the change in heat transfer from the recording head to the recording media due to the change in dimension of the gap 204.

The processing in step 606 analyzes the data obtained from the surface scan to determine if the recording surface is damaged. If the processing of step 606 determines that there is no recording surface damage, processing advances to step 612 wherein the shock determination system is rearmed and processing relating to the previously detected shock terminates. If the processing of step 606 determines that the surface is damaged, the processing continues with step 608 wherein the data which can still be read from the damaged surface is read and recorded on another, undamaged recording media surface of the disk drive. After transferring the data from a damaged surface to another recording media surface, the HDD controller 134 programs the disk drive configuration data to prevent the future use of the recording head for the damaged surface. This operation results in the recording head for the damaged surface remaining in the unloaded position, i.e., located within the load/unload ramp. Causing the recording head for the damaged surface to remain in the unloaded position reduces the amount of debris that may be generated within the disk drive housing by repeated contact of the recording head with the damaged recording surface, thereby increasing the reliability of the disk drive after it has been subjected to a shock.

The present invention can be realized in hardware, software, or a combination of hardware and software. A system according to a preferred embodiment of the present invention can be realized in a centralized fashion in device with one programmable processor, or in a distributed fashion where different elements are spread across several interconnected processors. Any kind of programmable processor, or other logic device, may be used. A typical combination of hardware and software could be a general purpose processor with a program that, when being loaded and executed, controls the processor such that it carries out the methods described herein.

The present invention can also be embedded in a computer program product, which comprises all the features enabling the implementation of the methods described herein, and which—when loaded in a processing system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for placing a recording head over a recording media within a rotatable storage device, the method comprising the steps of:

maintaining a plurality of recording heads within the rotatable storage device, wherein each recording head within the plurality of recording heads is individually activated and wherein each of the recording heads is parked when not activated;

determining a required recording head to access a requested data set, wherein the requested data set is stored within the rotatable storage device and wherein the required recording head is a recording head which accesses the requested data set; and activating only the required recording head to access the requested data set.

2. The method of claim 1, wherein one or more of the recording heads is parked by placement of the one or more recording heads on a load/unload ramp.

3. The method of claim 1, wherein one or more of the recording heads is parked by operating the one or more of the recording heads in a power savings mode.

4. The method of claim 1, further comprising the steps of:

determining a damaged recording surface within the rotatable storage device; and ceasing further use of a recording head that is associated with the damaged recording surface.

5. The method of claim 4, further comprising the step of copying data on the damaged recording surface to another recording surface.

6. A disk drive, comprising:

a plurality of recording heads within the disk drive, wherein each recording head within the plurality of recording head is individually activated and wherein each of the recording heads Is parked when not activated; and a disk drive controller for determining a required recording head to access a requested data set, wherein the requested data set is stored within the disk drive and wherein the required recording head is a recording head which accesses the requested data set.

7. The disk drive of claim 6, wherein one or more of the recording heads is parked by placement of the one or more recording heads on a load/unload ramp.

8. The disk drive of claim 6, wherein one or more of the recording heads is parked by operating the one or more of the recording heads in a power savings mode.

9. The disk drive of claim 6, wherein the disk drive controller further determines a subset of the plurality of recording heads to remain active and activates the subset of the plurality of recording heads.

10. The disk drive of claim 9, wherein the disk drive controller further determines a subset of the plurality of recording heads to remain active in order to improve data access performance.

11. The disk drive of claim 9, wherein the disk drive controller further determines a damaged recording surface within the disk drive and ceases further use of a recording head that is associated with the damaged recording surface.

12. The disk drive of claim 11, wherein the disk drive controller is further configured to copy data on the damaged recording surface to another recording surface.

13. A computer readable medium including computer instructions for a disk drive controller, the computer instructions comprising instructions for:

controlling a plurality of recording heads within a disk drive, wherein each recording head within the plurality of recording head is individually activated and wherein each recording head is parked when not activated;

determining a required recording head to access a requested data set, wherein the requested data set is stored within the disk drive and wherein the required recording head is a recording head which accesses the requested data set; and activating only the required recording head to access the requested data set.

14. The computer readable medium of claim 13, wherein one or more of the recording heads is parked by placement or the one or more recording heads on a load/unload ramp.

15. The computer readable medium of claim 13, wherein one or more of the recording heads is parked by operating the one or more of the recording heads in a power savings mode.

16. The computer readable medium of claim 13, further including computer instructions for:

determining a damaged recording surface within the disk drive; and ceasing further use of a recording head that is associated with the damaged recording surface.

17. The computer readable medium of claim 16, further comprising instruction copying data on the damaged recording surface to another recording surface.

* * * * *